Sept. 19, 1950      M. G. FULLER      2,523,208
SEEDING APPARATUS
Filed Dec. 2, 1944      2 Sheets—Sheet 1
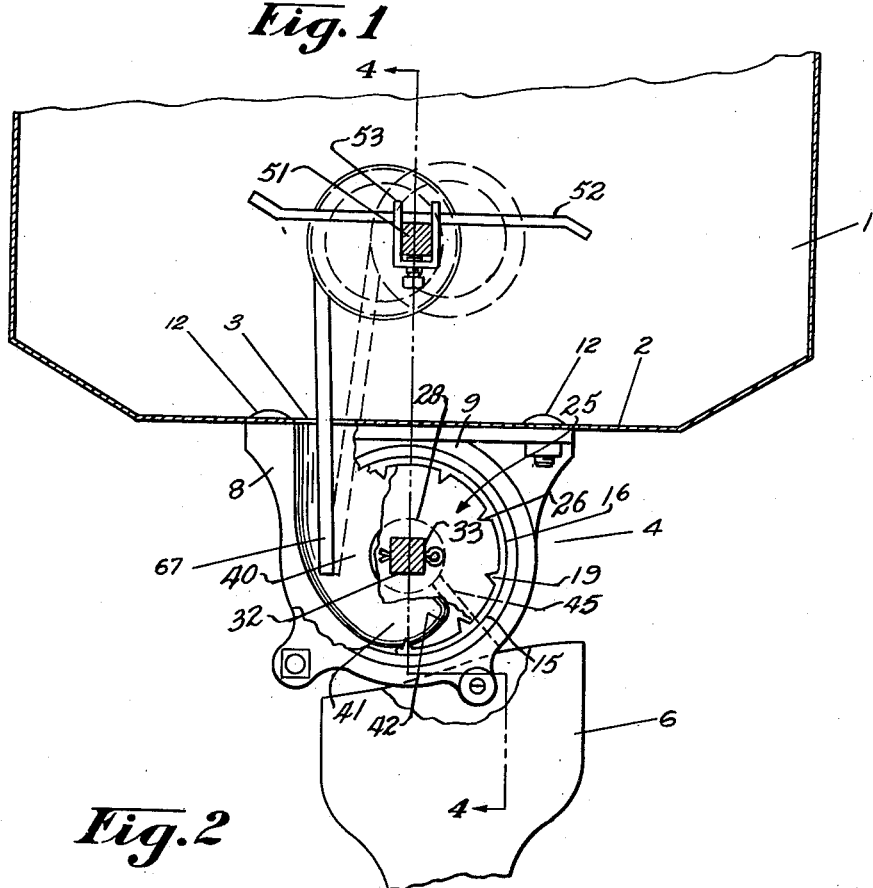
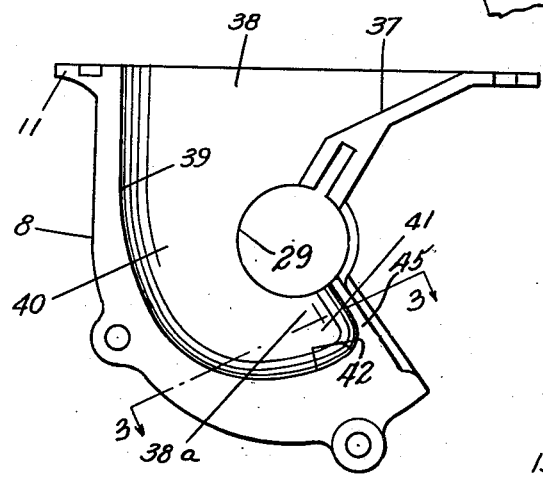
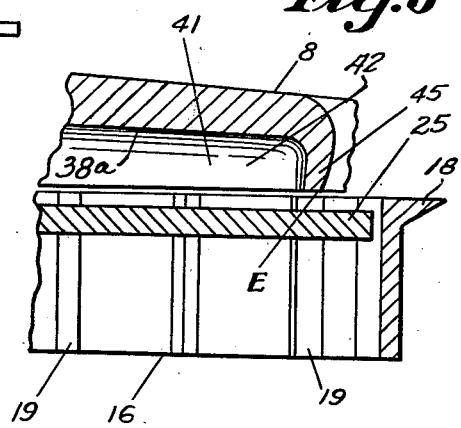
INVENTOR.
MARION G. FULLER
BY Flournoy Corey
ATTORNEY.

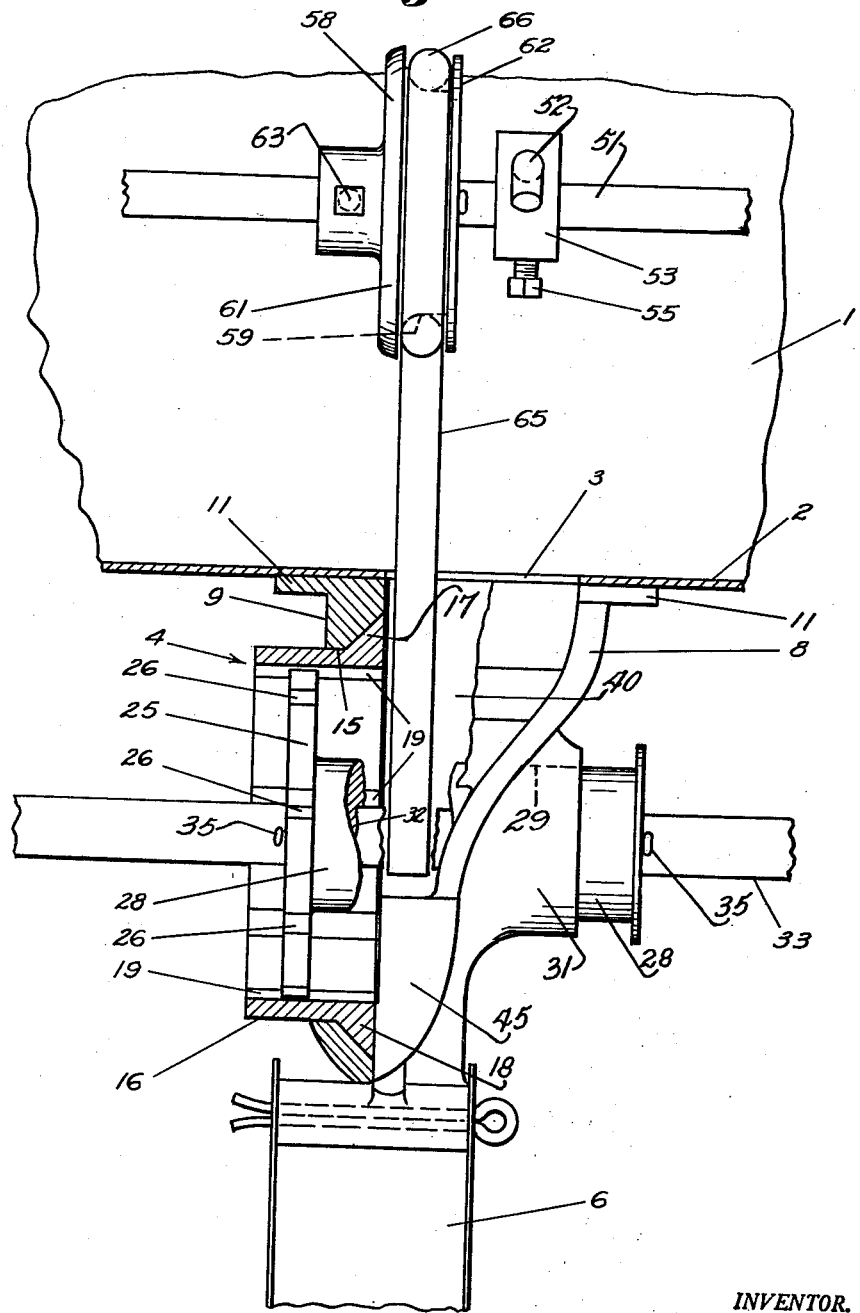

Patented Sept. 19, 1950

2,523,208

UNITED STATES PATENT OFFICE 2,523,208

SEEDING APPARATUS

Marion G. Fuller, Beatrice, Nebr., assignor to Dempster Mill Manufacturing Company, Beatrice, Nebr., a corporation of Nebraska Application December 2, 1944, Serial No. 566,263

1 Claim. (Cl. 222—226)

This invention relates to agricultural tools, such as seeding apparatus and the like.

The object of this invention is to provide a simple seed feeding mechanism particularly adapted for use in seeding all types of small grain. Another object of this invention is to provide a seed feeding device which is accurate within a wide range of adjustment for rates of feed and which does not tend to crack the seed when set for small quantities of seeding.

A further feature of this invention is to provide new and improved seed feeding mechanism for insuring accuracy and positive distribution by agitating the seed and by forcing the seed into seed cups from which they are discharged in a uniform manner. Another feature of this invention is to provide mechanism especially adapted to handle coarse and chaffy seed.

These and other objects of this invention will be clear to those skilled in the art from the following detailed description of a preferred form of the invention, as shown in the accompanying drawings, in which:

Figure 1 is a cross sectional view taken through the seed box of a seed distributor in which the present invention has been incorporated.

Figure 2 is a side view of one of the members making up the seed cup.

Figure 3 is an enlarged fragmentary sectional view, taken generally along the line 3—3 of Figure 2 but showing the seed feeding cylinder and disk in association with the structure of Fig. 2.

Figure 4 is a sectional view taken generally along the line 4—4 of Figure 1.

Referring now to Figure 1, a grain drill seed box is shown at 1 having a bottom wall 2 in which, along the length thereof, are a plurality of openings 3 under which are seed feeding cups 4. The latter discharge into seed tubes 6. Each of the seed cups 4 comprises a mating pair of castings 8 and 9, each flanged, as at 11, by which the seed cups are secured to the seed box, as by bolts 12. The seed cup member 9 has a central opening 15 in which an interiorly fluted seed feeding cylinder 16 is rotatably mounted. The member 9 is beveled at 17 to receive a flaring flange 18 by which laterally outward movement is limited. The flutes 19 of the grain cylinder 16 are V-shaped in section and extend axially the length of the cylinder 16.

Slidably mounted in the seed cup 4 is a laterally adjustable disk 25 notched, as at 26, to receive the flutes or ribs 19 of the seed cylinder 16. The disk includes a hub 28 that extends laterally outwardly through an opening 29 in a boss 31 formed on the other seed cup member 8, as best shown in Figure 4. The hub section of the disk member 25 has a squared central opening 32 through which a seeding shaft 33 is extended. The latter passes through all of the associated seed cups 4. The disk member 25 is secured against endwise movement relative to the seeding shaft 33 by means of cotters 35 or the like, one at each side of the disk member 25, and the seeding shaft is endwise adjustable by conventional means (not shown) for the purpose of varying the discharge capacity of the seed cups through which it passes. As the shaft 33 is adjusted endwise, the associated disk members 25 are shifted laterally in the associated seeding cylinders 16, thus varying the effective discharge openings of the several seed cups and varying the seeding capacity thereof.

As best shown in Figures 2 and 3, the seed cup member 8 is of particular construction. The member 8 has a sloping end wall 37 and a downwardly and laterally inwardly sloping side wall 38 which, in connection with a rear wall 39, form a seed chamber 40 that diminishes uniformly in cross sectional area and terminates in a discharge throat 41. The seed cup wall 39 curves forwardly under the hub 28 and then passes into the throat 41 with an upward slope, as at 42, and as best shown in Figure 3, the discharge throat 41 is of appreciable width laterally relative to the adjacent edge of the seed cylinder 16. The discharge throat or passage is terminated by a shoulder or wall 45 which is substantially perpendicular with respect to the plane of the disk 25. From Figure 1 it will be seen that the upwardly or radially inwardly sloping seed throat bottom wall 42 extends radially inwardly beyond the path of the ribs or flutes 19.

In operation, during the rotation of the seeding cylinder, the seed is discharged through the opening formed between the disk 25 and the edge of the wall 45. By virtue of the widened throat, as shown best in Figure 3, there is adequate space to provide for the accumulation of seed but without any danger of cracking or crushing the seed, as might be the case if, for example, the side wall section 38a (Figures 2 and 3) approached the plane of the inner end of the seed cylinder 16 with a gradual angle which might cause the seed to wedge or bridge in between the disk 25 and the adjacent edge of the discharge throat chamber. It will be understood that the disk 25 is adjusted closer or farther from the edge E (Figure 3) for decreasing or increasing the rate of seeding and/or handling the smaller or larger sizes of seed.

An agitator shaft 51 is supported in the seed box 1 and driven in any suitable manner. The shaft 51 carries a plurality of agitating arms or rods 52 secured to the shaft 51 by clamps 53 or other suitable means. Preferably the shaft 51 is driven from the seeding shaft 33 or by the same drive means, although this may vary as desired. Secured to each clamp 53 is a set screw 55 by which the agitator rod is effectively secured against lateral displacement.

Substantially directly above each of the seed cups 4 the agitator shaft carries a cam member 58, preferably formed as an eccentric disk having a loop receiving surface 59 and a radial flange 61. A cap or plate 62 is mounted on the shaft 51 adjacent each eccentric, as best shown in Figure 4, and each eccentric 58 is held in place on the shaft 51 by a set screw 63.

For most seeds, such as wheat, rye, oats, barley or the like, the agitation produced by the arms 52 is sufficient to assure uniform flow of seed into the seed cups 4, but in the case of seeds having chaffy or bearded hulls, such as brome grass, cotton, or the like, more positive feed is desired. To this end, I provide a force feeding device for positively forcing seed down into the seed cups 4. A force feed rod 65 is mounted on each eccentric 58, as by having a loop section 66 disposed about the groove or seat 59 between the flange 61 and the plate 62. As best shown in Figure 1, the lower end 67 of the agitating and feeding rod 65 extends well down into the seed chamber 40 in the associated seed cup 4.

In operation, the rotation of the agitating shaft 51 not only oscillates the lower end 67 of the agitating rod 65 but also the latter is given a fore and aft movement as well. The vertical motion of the rod 65 serves to prevent the seed from arching or bridging across the seed discharge throat and it also forces the seed down into the seed cup. The fore and aft movement of the rod 65 tends to keep the seed stirred and materially facilitates the steady flow of seed down through the seed passage 40.

It is to be understood that this invention is not to be limited by the detailed construction described above but only by the appended claim.

What I claim is:

A seed feeder including a cup section and a seed feeder section, each having abutting vertical inner faces and each having an outer face, means for securing the two sections together with said inner faces in contact, the cup section having a bearing opening therein, the feeder section having a substantially circular seat in its inner face surface and concentric with the said bearing opening and of larger cross-sectional diameter than said opening, an interiorly fluted hollow seed feeding cylinder having a flange at one exterior end portion thereof, which flange is substantially commensurate in cross section and size so as to seat in the said circular seat and allow for rotation of the cylinder relative to the cup and feeder sections and with the other end portion of the said cylinder projecting outwardly beyond the outer face portion of the said feeder section, a disc having spaced notches in its periphery and positioned within the cylinder with the notches in engagement with the said flutes and having thereon and substantially centrally thereof a laterally projecting hub which extends into the cup section and is positioned in the said bearing opening and which disc and hub are capable of axial movement as well as rotative movement with the said cylinder and is bodily removable and replaceable from the said other end of the cylinder when the two sections are secured together, the cup section having a face portion thereof cut away and exposing a part of the flanged end of the cylinder and including an inclined exterior edge portion and an interior wall portion that extends outwardly from the said inner face portion of the cup section at the lower part thereof from the bearing opening to adjacent a closed lower end of the cup section and there being a passageway in the cup section extending to the said wall and allowing the seed to enter therein and into the interior of the fluted cylinder, and when the said cylinder is rotated the seed is picked up by the said flutes and moved to adjacent the said wall and, upon further rotation, the said seed is discharged over the said wall and the outer edge of the cut-away portion of the cup section.

MARION G. FULLER.

REFERENCES CITED

The following references are of record in the file of this patent:

UNITED STATES PATENTS

| Number | Name | Date |
|---|---|---|
| 312,975 | Cottom | Feb. 24, 1885 |
| 339,578 | Preston | Apr. 6, 1886 |
| 558,526 | Schimpff | Apr. 21, 1896 |
| 671,587 | Denyes et al. | Apr. 9, 1901 |
| 860,695 | Rowell | July 23, 1907 |